United States Patent [19]

Boyd

[11] Patent Number: 5,384,633
[45] Date of Patent: Jan. 24, 1995

[54] COPY WAITING MACHINE INTERRUPT SLOT MODE

[75] Inventor: Brent A. Boyd, Rochester, N.Y.

[73] Assignee: Xerox Corporation, Stamford, Conn.

[21] Appl. No.: 36,576

[22] Filed: Mar. 24, 1993

[51] Int. Cl.⁶ ............................................ G03G 15/00
[52] U.S. Cl. .................................... 355/314; 355/200; 355/204; 355/208; 355/308
[58] Field of Search ................. 355/200, 202–204, 355/208, 308–309, 313–314, 321; 358/296, 300

[56] References Cited

U.S. PATENT DOCUMENTS

| | | | |
|---|---|---|---|
| 4,273,439 | 6/1981 | Markham et al. | 355/314 |
| 4,297,025 | 10/1981 | Bach et al. | 355/314 |
| 4,956,667 | 9/1990 | Gartner | 355/202 |
| 5,119,472 | 6/1992 | Ogawa | 355/309 X |
| 5,152,001 | 9/1992 | Hanamoto | 355/314 X |
| 5,206,735 | 4/1993 | Gauronski et al. | 355/313 X |

Primary Examiner—Matthew S. Smith
Attorney, Agent, or Firm—Ronald F. Chapuran

[57] ABSTRACT

A method of rapid machine interrupt of a job in process independent of the machine interrupt feature including the steps of activating the copy wait feature, detecting the document present at the document slot, and conveying said document present at the document slot to an imaging platen whereby copies of the document in the document slot are produced independent of the machine interrupt feature in an electronic image processing apparatus having a plurality of image processing resources for reproducing images including a controller with a user interface for directing the operation of the image processing resources, the user interface including a machine interrupt feature and a copy wait feature, the document slot for receiving individual documents to be copied.

8 Claims, 4 Drawing Sheets

COPY WAITING MACHINE INTERRUPT SLOT MODE

BACKGROUND OF THE INVENTION

The invention relates to job interrupt, and more particularly, to job interrupt without undue machine recycle wait time.

Job interrupt is a well known feature to suspend a job in process in a machine in order to run a second job as a courtesy to another operator or to run a second job of higher immediate priority. To be able to resume the first job after the completion of the second job, the status of the first job must be preserved and the machine suitably reset to continue the first job after completion of the second job. In particular, if the first job requires use of an automatic document handler, the resetting the machine often requires the recycling of the documents in the automatic document handler before commencing the run of the second job. Resetting and recycling the machine to begin operation of the second job can be relatively time consuming and this "dead" time before beginning the second job diminishes the overall efficiency and productivity of the machine. This dead time is particularly onerous when an immediate job interrupt is requested for a second job requirement of only one or very few copy sheets.

It would be desirable to provide a relatively rapid interrupt to significantly lessen the machine recycle or dead time before initiation of the second job. It is an object, therefore, of the present invention to provide a copy wait feature that eliminates time consuming machine resetting and status save before initiation of relatively low volume second jobs. Another object of the present invention is to provide a copy wait option with a relatively short transition time period to interrupt a job in process to commence a relatively simple second job requirement in addition to a job interrupt option with a relatively long transition time period to interrupt a job in process to commence a relatively complex second job requirement. Other advantages of the present invention will become apparent as the following description proceeds, and the features characterizing the invention will be pointed out with particularity in the claims annexed to and forming a part of this specification.

SUMMARY OF THE INVENTION

In an electronic image processing apparatus having a plurality of image processing resources for reproducing images including a controller with a user interface for directing the operation of the image processing resources, the user interface including a machine interrupt feature and a copy wait feature, a document slot for receiving individual documents to be copied, a method of rapid machine interrupt of a job in process independent of the machine interrupt feature including the steps of activating the copy wait feature, detecting the document present at the document slot, and conveying said document present at the document slot to an imaging platen whereby copies of the document in the document slot are produced independent of the machine interrupt feature.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
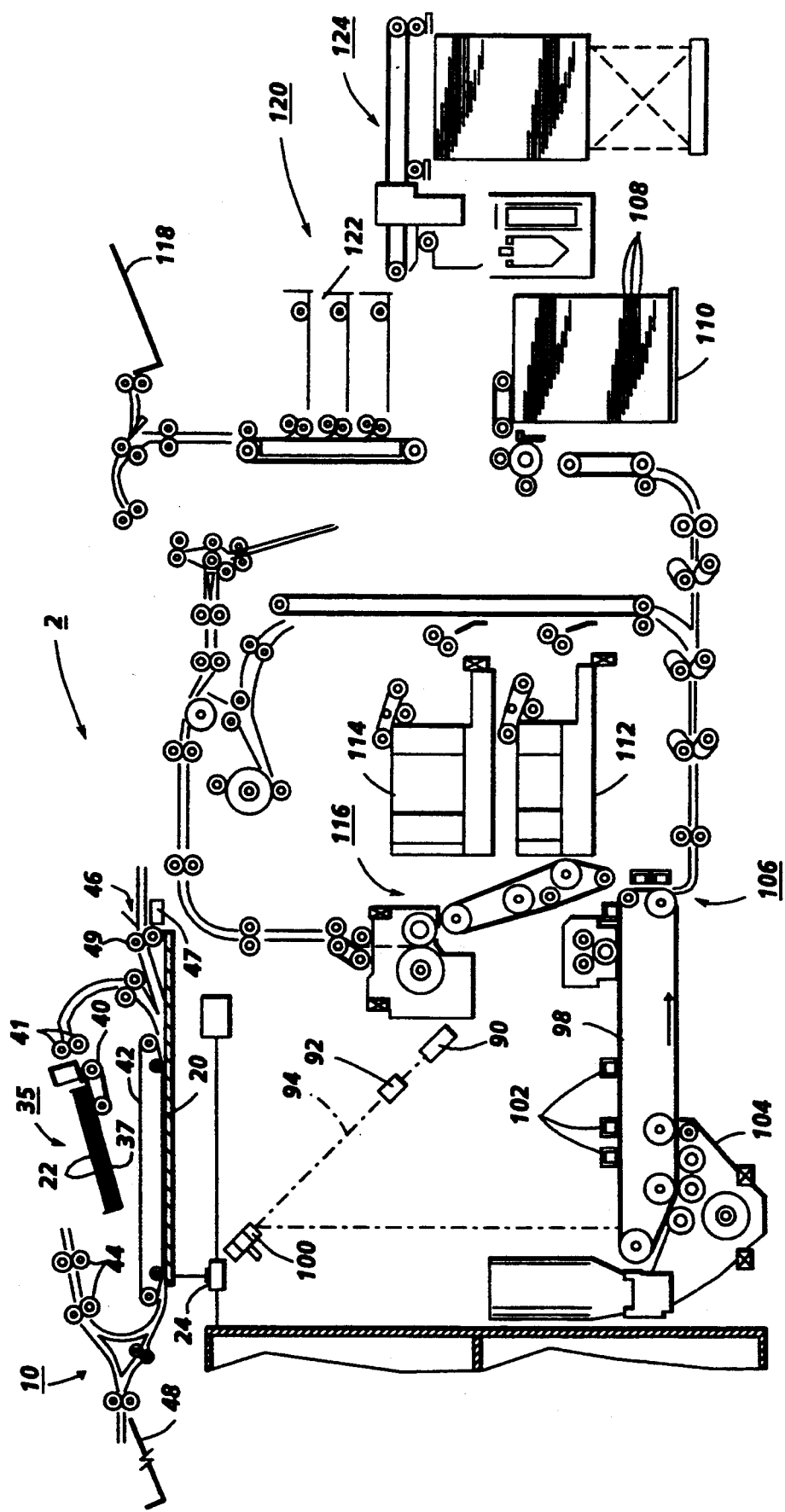
FIG. 1 is an elevational view depicting an electronic printing system incorporating the present invention.
Figure 2:
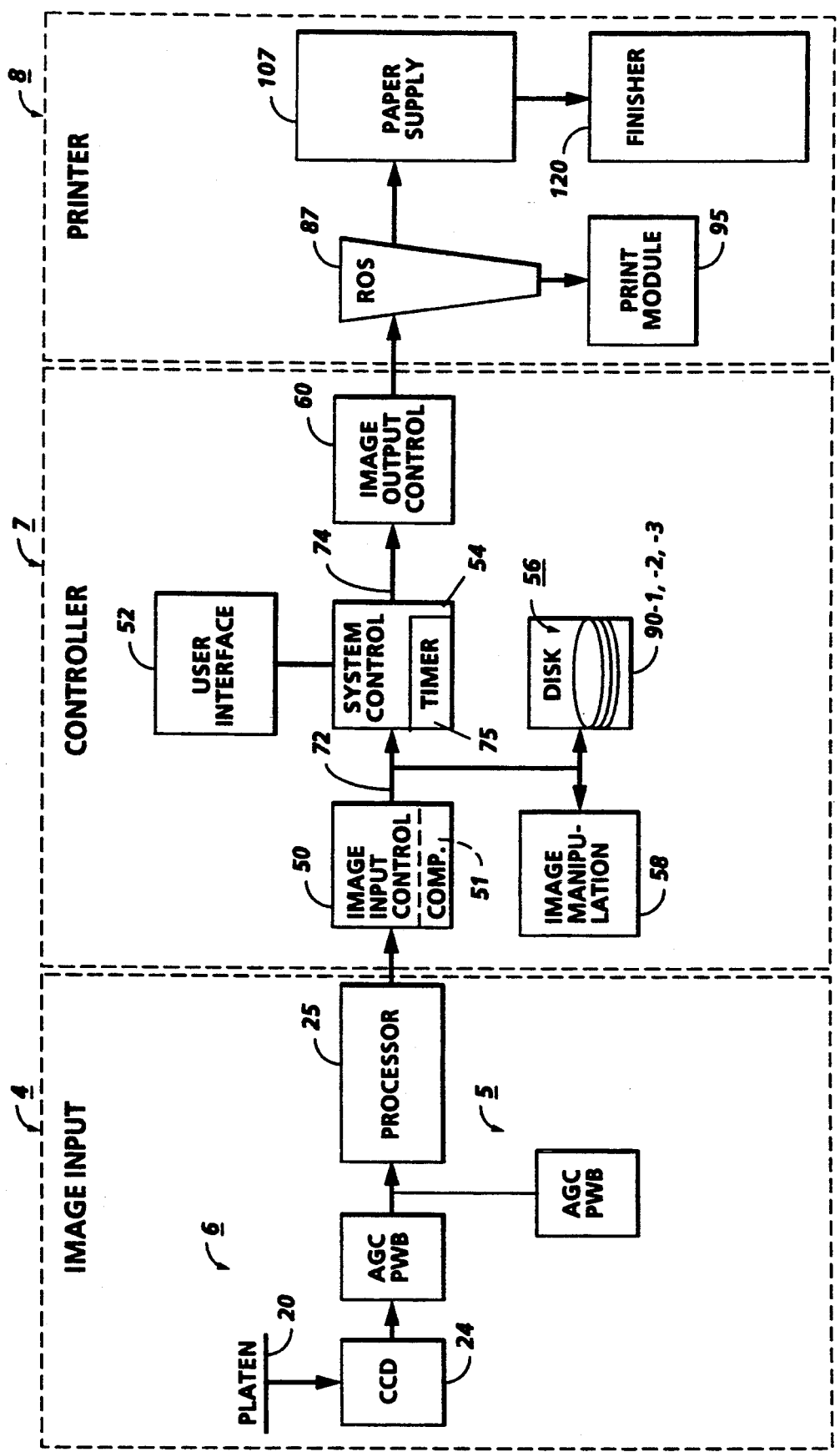
FIG. 2 is a block diagram depicting the major control elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems or light lens Xerographic systems such as ink jet, ionographic, etc.

Scanner section 6 incorporates a transparent platen 20 on which the document 22 to be scanned is located. One or more linear arrays 24 are supported for reciprocating scanning movement below platen 20. A riot shown lens and mirror system cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode, including a Book mode and a Computer Forms Feeder (CFF) mode, are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20. It should be understood that the document scanner could be a light/lens system and that the invention is intended to cover various methods of projecting an image onto a photoreceptor.

With continued reference to FIGS. 1 and 2, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotron 102 at a charging station preparatory to exposure by imaging beams 94.

The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Controller section 7 is, for explanation purposes, divided into an image input controller 50, User Interface (UI) 52, system controller 54, main memory 56, image manipulation section 58 and image output controller 60. The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer.

The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory which comprises a Random Access Memory or RAM pending transfer to main memory 56 where the data is held pending use.

Figure 3:
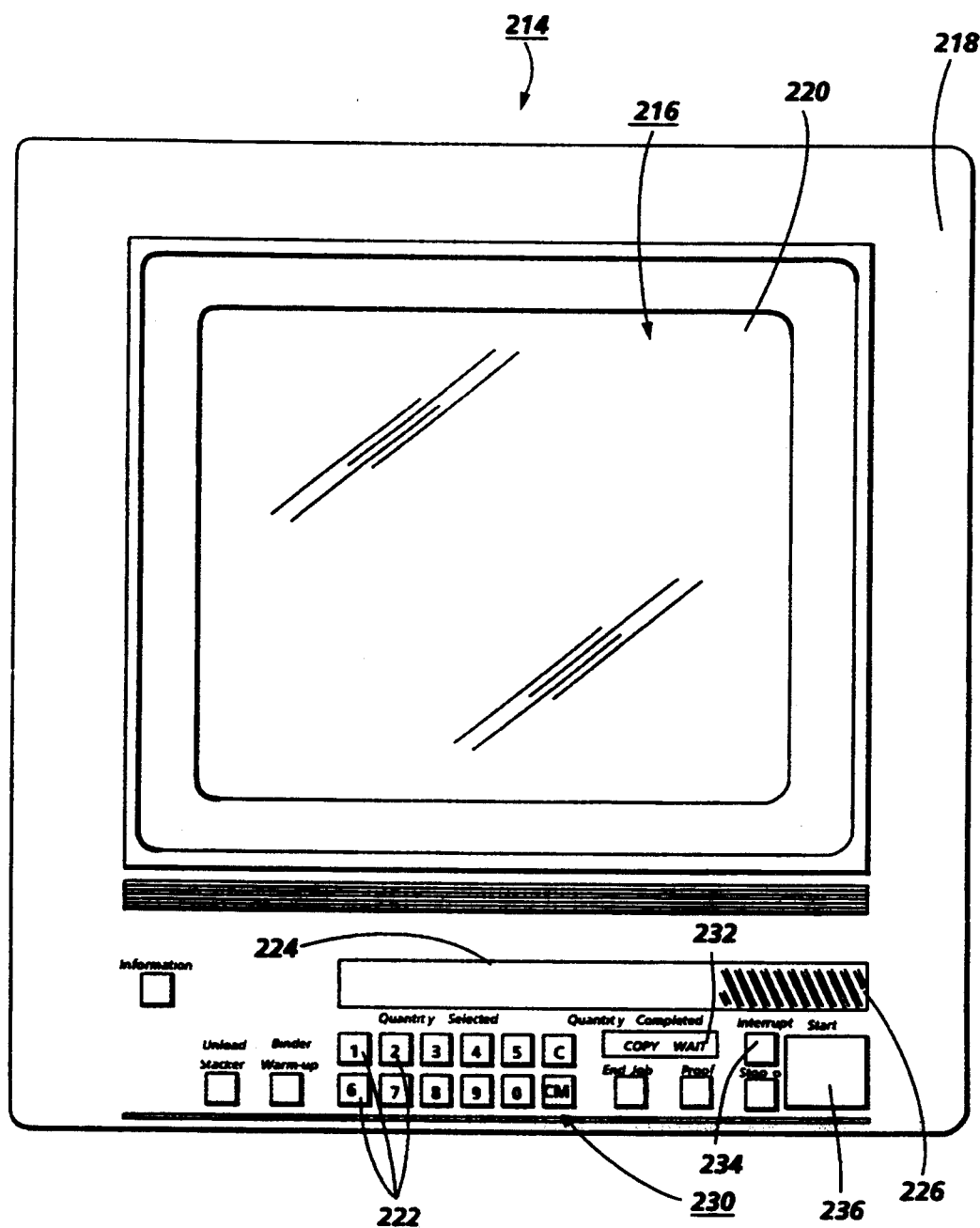
FIG. 3 illustrates a typical user interface screen incorporating the present invention.

Referring to FIG. 3, there is shown the color touch monitor 214 for the touch dialogue U.I. 213. Monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 214 of UI 52, or is required by printer section 8, the data is accessed in main memory 56. Where further processing other than that provided by processor 25 is required, the data is transferred to image manipulation section 58 where the additional processing steps such as collation, make ready, decomposition, etc. are carried out.

Following processing, the data may be returned to main memory 56, sent to UI 52 for display on touchscreen 62, or sent to image output controller 60. Image data output to image output controller 60 is decompressed and readied for printing by not shown image generating processors. Following this, the data is output by not shown dispatch processors to printer section 8. Image data sent to printer section 8 for printing is normally purged from memory 56 to make room for new image data.

In accordance with the present invention, in order to interrupt the machine and process relatively simple jobs, without undue wait time, the operator merely engages the copy wait button 232 as illustrated in FIG. 3, rather than the normal interrupt button 234 after placing a copy sheet in the SADH slot 46. The operator then enters the number of copies desired using keys 222 and pushes the start button 236. As soon as the copy wait button has been pushed, the control looks for a document in the SADH slot 46. Upon detecting a document in the slot 46 by any suitable document sensor, such as sensor 47 illustrated in FIG. 1, and upon activation of the start button 236, a document in the SADH slot 46 is fed onto the platen glass 20 for scanning and copying. This occurs immediately after any current document on the platen glass 20 is moved from the platen glass back onto the top of the paper stack in tray 37 of the automatic document handler 35.

It should be understood that the copy wait mode will not be invoked in a preferred embodiment if the job in process is relatively simple, that is, not a job of a multiple set of documents in the document handler 35. In addition, the copy wait will not be invoked for a relatively complex job with multiple documents in the document tray 37 and the job is almost complete. Thus, any suitable timer, such as illustrated at 75 in FIG. 2, determines the time to completion of the current job. It should be noted that the calculation of time remaining to complete a job can be any suitable technique for estimating the total completion time for a job based upon the initial document set and the number of copies required as disclosed in U.S. Pat. No. 5,036,361 filed Mar. 21, 1990 incorporated herein. There could also be a suitable display of time to completion as a visual guide as to whether or not a copy waiting mode is appropriate at any given time during a current job run. Obviously, if the job in process is near completion, it may be much more efficient to simply let the job in process be completed before suspending completion for even a relatively simple second job requirement.

Normally therefore, copy wait is more appropriate when invoked to suspend a job in process that is relatively complex and is not near completion. Such jobs generally include the production of multiple copies of a multi-document set that has been loaded into the document tray 37 for recirculation and copying. In operation, as one document is fed onto platen 20 to be scanned by the array 24, and removed from the platen 20 to the top of the document stack in tray 37, almost simultaneously another document is being removed from the bottom of the document stack in tray 37 to the platen 20. In the copy wait mode, the next document comes from the SADH slot 46 and not from the bottom of the document stack in tray 37. There is normal dead time encountered in normal interrupt caused by documents recirculating to the starting order before interrupt. This delay or dead time is avoided by the copy wait feature since the document at SADH 46 is immediately accepted. There is no reordering of the documents in the document set on the tray 37 to the initial starting order, but merely the removal of the document presently on the platen 20 to the top of the stack simultaneously with the movement of the document in the SADH slot 46 to the platen 20.

The copy wait job will continue if other documents are detected at the slot 46 while the document on the platen 20 is being scanned and copied. The copy wait job is completed and the suspended job allowed to continue once the document on the platen 20 has been scanned and copied for a number of copies selected and no other document is detected at the slot 46. It should be noted that the throughput or efficiency of the interrupted job is also increased since there is no need to recirculate originals in tray 37 to the order at the time copy waiting was invoked once the suspended job continues. This is particularly appropriate in a light/lens system. The efficiency of the second job easily decreases by as much as 40 to 50 seconds depending upon the number of documents in the automatic document handler and the present state of the job in process. Note with regard to the time to completion, any suitable threshold level such as 2–5 seconds can be set in nonvolatile memory to allow completion of the job in process without invoking the copy waiting.

Figure 4:
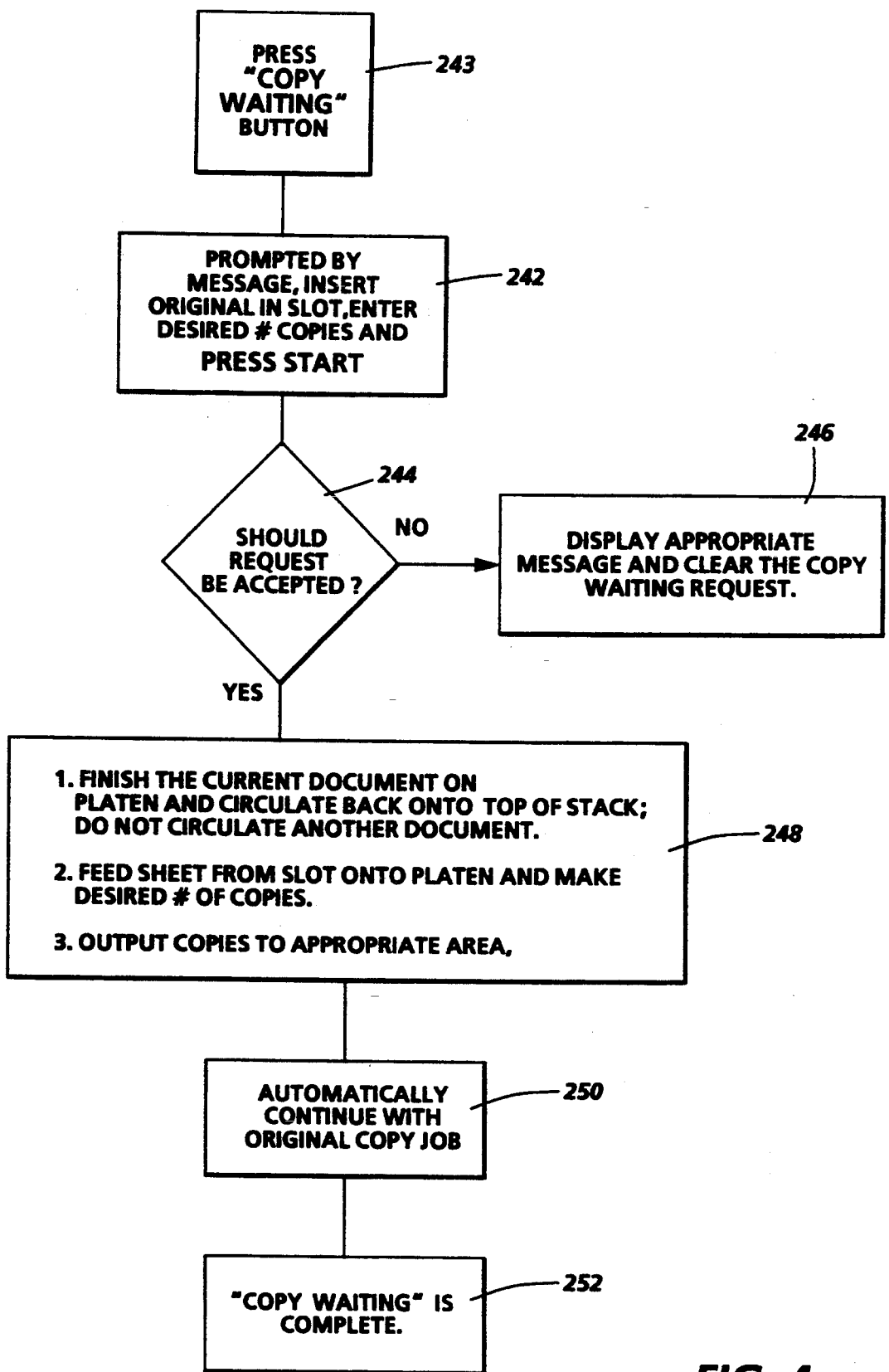
FIG. 4 is a flow chart illustrating the Copy Waiting feature in accordance with the present invention.

With reference to FIG. 4, there is illustrated a flowchart in accordance with the present invention. At block 240 the operator presses the copy wait button 232. If a document has not already been inserted at the SADH slot 46, a suitable message on the screen 216 could then prompt the operator to insert an original in the slot as illustrated at block 242. In addition, the operator can be prompted by suitable messages to enter the number of copies required and to press the start button to initiate the copy waiting function. At block 244 there is a decision as to whether or not the request or the copy waiting mode should be entered. As discussed above, for example, if the job in process is near completion, within a range or time as stored in volatile memory, it would be impractical to enter the copy waiting mode at this time. Thus, if the control does not accept the copy waiting function as illustrated at block 246, there can be any suitable display such as to clear the copy waiting request.

If the copy waiting function is accepted, then the machine processes the current document on the platen and circulates the document to the top of the stack in the tray 37. The machine does not circulate another document from the stack. The control then feeds the document from the slot 46 onto the platen 20 to make the desired number of copies which are output to the appropriate area or tray. Once the appropriate number of copies have been produced and no other documents are sensed at the slot 46, the control automatically continues with the interrupted job as illustrated at block 250 and as illustrated at block 252, the copy waiting mode has been completed.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In an electronic image processing apparatus having a plurality of image processing resources for reproducing Images including a controller with a user interface for directing the operation of the image processing resources, the user interface including a machine Interrupt feature and a copy wait feature, both the machine interrupt feature and the copy wait feature being capable of suspending a job in process, saving status of the job in process, completing a second job, and resuming the job in process from the point of suspension, an automatic document handler for cycling a set of documents to be copied, a document slot for receiving individual documents to be copied, a method of rapid machine interrupt of a job in process independent of the machine interrupt feature, the job in process having documents in the automatic document handler, comprising the steps of:

inserting a document in the document slot,
    activating the copy wait feature, the controller automatically determining if the job in process will be completed in a time period greater than a given time period,
    detecting the document present at the document slot selecting the number of copies desired, and enabling a machine start button whereby copies of the document in the document slot are produced without the need to recycle the documents in the automatic document handler.

2. The method of claim 1 including a step of sequentially inserting documents into the document slot.

3. In an electronic image processing apparatus having a plurality of image processing resources for reproducing images including a controller with a user interface for directing the operation of the image processing resources, the user interface including a machine interrupt feature and a copy wait feature, the machine interrupt and copy wait features adapted to suspend a job in process to complete a second job and continue the job in process from the point of suspension, an automatic document handler for cycling a set of documents to be copied, a document slot for receiving individual documents to be copied, a method of rapid machine interrupt of a job in process independent of the machine interrupt feature, the job in process having documents in the automatic document handler, comprising the steps of:

activating the copy wait feature, the controller automatically determining that the job in process will not be completed within a given time period, detecting the document present at the document slot, and conveying said document present at the document slot to an imaging platen whereby copies of the document in the document slot are produced without the need to recycle the documents in the automatic document handler.

4. The method of claim 3 including a step of inserting and detecting a document in the document slot.

5. In an electronic image processing apparatus having a plurality of image processing resources for reproducing images including a controller with a user interface for directing the operation of the image processing resources, the user interface including a machine interrupt feature and a copy wait feature, a document slot for receiving individual documents to be copied, a method of rapid machine interrupt of a job in process independent of the machine interrupt feature, comprising the steps of:

activating the copy wait feature including the step of inserting a document in the document slot, detecting the document present at the document slot, and conveying said document present at the document slot to an imaging platen whereby copies of the document in the document slot are produced independent of the machine interrupt feature.

6. The method of claim 5 including a step of automatically determining that the job in process will not be completed within a given time period.

7. In an electronic image processing apparatus having a plurality of image processing resources for reproducing images including a controller with a user interface for directing the operation of the image processing resources, the user interface including a machine interrupt feature and a copy wait feature each of which provides for suspending a job in process to complete a second job before resuming the job in process, the copy wait feature providing machine access in a first period of time, the machine interrupt feature providing machine access in a second period of time, a method of suspension of a job in process independent of the machine interrupt feature, comprising the steps of:

activating the copy wait feature, detecting the copy wait feature distinct from the machine interrupt feature, providing machine access within said first period of time, and producing predetermined copies of a document during suspension of the job in process independent of the machine interrupt feature.

8. The method of claim 7 wherein the electronic image processing apparatus includes a document slot and including a step of inserting a document in the document slot.

* * * * *